US011548604B1

(12) United States Patent
Misorski et al.

(10) Patent No.: US 11,548,604 B1
(45) Date of Patent: Jan. 10, 2023

(54) MARINE ENGINE CRANKCASE COVER WITH INTEGRAL OIL COOLER

(71) Applicant: Brunswick Corporation, Mettawa, IL (US)

(72) Inventors: Christopher J. Misorski, Fond du Lac, WI (US); Thomas F. Nickols, Fond du Lac, WI (US); Daniel P. Hoffman, Fond du Lac, WI (US); David J. Belter, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 28 days.

(21) Appl. No.: 17/061,639

(22) Filed: Oct. 2, 2020

(51) Int. Cl.
| B63H 21/38 | (2006.01) |
| B63H 21/14 | (2006.01) |
| F01M 11/00 | (2006.01) |
| F01M 5/00 | (2006.01) |

(52) U.S. Cl.
CPC .......... *B63H 21/386* (2013.01); *B63H 21/14* (2013.01); *B63H 21/383* (2013.01); *F01M 11/0004* (2013.01); *F01M 5/002* (2013.01); *F01M 2011/0025* (2013.01)

(58) Field of Classification Search
CPC .... B63H 21/386; B63H 21/14; B63H 21/383; F01M 11/0004; F01M 5/002; F01M 2011/0025
See application file for complete search history.

(56) References Cited

U.S. PATENT DOCUMENTS

| 4,544,029 | A | * | 10/1985 | Cadars | ................. | F28F 9/0226 165/149 |
| 5,899,182 | A | * | 5/1999 | Martinsson | ............. | F02B 77/00 123/90.38 |
| 6,257,193 | B1 | * | 7/2001 | Alpan | ................ | F01M 11/0004 123/196 R |
| 6,286,476 | B1 | * | 9/2001 | Hiraoka | .................. | F02B 75/22 123/196 R |
| 6,550,448 | B1 | * | 4/2003 | Isogawa | ........... | F02M 35/10216 123/336 |
| 6,817,335 | B2 | | 11/2004 | Groddeck et al. | | |
| 6,923,935 | B1 | | 8/2005 | Donahue et al. | | |
| 7,198,019 | B1 | | 4/2007 | Belter | | |

(Continued)

FOREIGN PATENT DOCUMENTS

CN       201627613 U    11/2010

OTHER PUBLICATIONS

Hoffman et al., "Fastening Structures with High Coefficient of Thermal Expansion for Reduction of Thermally Driven Stresses in Securing Aluminum Silicon Alloys," Unpublished U.S. Appl. No. 15/895,616, filed Feb. 13, 2018.

*Primary Examiner* — Kurt Philip Liethen
(74) *Attorney, Agent, or Firm* — Andrus Intellectual Property Law, LLP

(57) ABSTRACT

A marine engine has a crankshaft that rotates about a crankshaft axis; a crankcase supporting the crankshaft, the crankcase being made primarily of a first material; and a cover on the crankcase. The cover includes a heat exchanger having an inner plate facing an interior of the crankcase, and the inner plate is located such that rotation of the crankshaft causes lubricant in the crankcase to impinge upon the inner plate. The cover also includes a frame holding the heat exchanger and isolating the heat exchanger from direct contact with the crankcase. At least a portion of the frame is made of a second material that is more compliant than the first material.

16 Claims, 7 Drawing Sheets

(56) References Cited

U.S. PATENT DOCUMENTS

| | | | |
|---|---|---|---|
| 7,225,785 B2 | 6/2007 | Groddeck et al. | |
| 7,347,905 B1 | 3/2008 | Donahue et al. | |
| 7,666,353 B2 | 2/2010 | Donahue et al. | |
| 8,696,394 B1 | 4/2014 | Langenfeld et al. | |
| 9,457,881 B1 | 10/2016 | Belter et al. | |
| 9,797,665 B2 * | 10/2017 | Müller-Lufft | F01M 5/002 |
| 10,006,419 B1 | 6/2018 | Hoffman et al. | |
| 10,344,639 B1 | 7/2019 | Nickols et al. | |
| 10,865,671 B2 * | 12/2020 | Shieh | F01M 11/0004 |
| 11,066,968 B1 * | 7/2021 | Nickols | F02M 35/167 |
| 2004/0031631 A1 * | 2/2004 | Pichler | B60K 5/04 |
| | | | 180/68.3 |
| 2004/0177827 A1 * | 9/2004 | Hoyte | F01M 11/0004 |
| | | | 123/196 AB |
| 2005/0011482 A1 * | 1/2005 | Groddeck | F01M 11/065 |
| | | | 123/195 C |
| 2008/0202724 A1 * | 8/2008 | Lorenz | F28D 7/0075 |
| | | | 403/24 |
| 2014/0020866 A1 * | 1/2014 | Bluetling | F28F 3/00 |
| | | | 165/104.19 |
| 2015/0047598 A1 * | 2/2015 | Osterchill | F01M 11/12 |
| | | | 123/196 R |
| 2018/0202513 A1 * | 7/2018 | Nardella | B64D 27/04 |
| 2018/0251202 A1 | 9/2018 | Saruwatari et al. | |
| 2020/0191029 A1 * | 6/2020 | Kringels | F01M 11/0004 |
| 2020/0309472 A1 * | 10/2020 | Thomas | F01M 5/002 |

\* cited by examiner

MARINE ENGINE CRANKCASE COVER WITH INTEGRAL OIL COOLER

FIELD

The present disclosure relates to marine engines with having a heat exchanger integrated into a cover on the crankcase for cooling lubricant in the crankcase.

BACKGROUND

U.S. Pat. No. 7,198,019 discloses a lubricating system for a marine engine that provides a lubrication deflector which extends from the cylinder block of the engine toward rotating surfaces of a crankshaft and/or connecting rod. A lubrication passage is provided as an integral part of a cylinder block of the marine engine to direct a flow of liquid lubricant away from the lubrication deflectors and downwardly toward a lubrication reservoir, or sump.

U.S. Pat. No. 8,696,394 discloses a marine propulsion system comprising an internal combustion engine, a cooling circuit carrying cooling fluid that cools the internal combustion engine, a sump holding oil that drains from the internal combustion engine, and a heat exchanger receiving the cooling fluid. The oil that drains from the internal combustion engine to the sump passes through and is cooled by the heat exchanger.

U.S. Pat. No. 9,457,881 discloses an outboard marine engine having an engine block; a crankcase on the engine block; a crankshaft disposed in the crankcase for rotation about a crankshaft axis; a cover on the crankcase; a bedplate disposed between the engine block and the cover, the bedplate having a plurality of bearings for supporting rotation of the crankshaft; and a cooling water jacket that extends parallel to the crankshaft axis along a radially outer portion of the plurality of bearings. The cooling water jacket carries cooling water for cooling the plurality of bearings and at least one oil drain-back area is located adjacent to the cooling water jacket. The at least one oil drain-back area drains oil from the crankcase.

U.S. Pat. No. 10,344,639 discloses a marine engine having a crankcase having a crankshaft that rotates about a vertical crankshaft axis; a cover on the crankcase; and a cooling member disposed in the crankcase. The cooling member has an inner surface that faces the crankshaft and an outer surface that faces the cover. The cooling member is configured such that rotation of the crankshaft causes lubricant in the crankcase to impinge on and drain down both the inner and outer surfaces of the cooling member.

The above patents are incorporated herein by reference in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a marine engine comprises a crankshaft that rotates about a crankshaft axis; a crankcase supporting the crankshaft, the crankcase being made primarily of a first material; and a cover on the crankcase. The cover comprises a heat exchanger having an inner plate facing an interior of the crankcase, and the inner plate is located such that rotation of the crankshaft causes lubricant in the crankcase to impinge upon the inner plate. The cover also comprises a frame holding the heat exchanger and isolating the heat exchanger from direct contact with the crankcase. At least a portion of the frame is made of a second material that is more compliant than the first material.

According to another example of the present disclosure, a cover for a crankcase of a marine engine comprises a heat exchanger having an inner plate configured to face an interior of the crankcase when the cover is installed on the crankcase such that rotation of a crankshaft supported in the crankcase causes lubricant in the crankcase to impinge upon the inner plate. The cover also comprises a frame holding the heat exchanger and configured to isolate the heat exchanger from direct contact with the crankcase. At least a portion of the frame is made of a material that is more compliant than a material of which the crankcase is made.

BRIEF DESCRIPTION OF DRAWINGS

The present disclosure is described with reference to the following Figures. The same numbers are used throughout the Figures to reference like features and like components.

DETAILED DESCRIPTION

Figure 1:
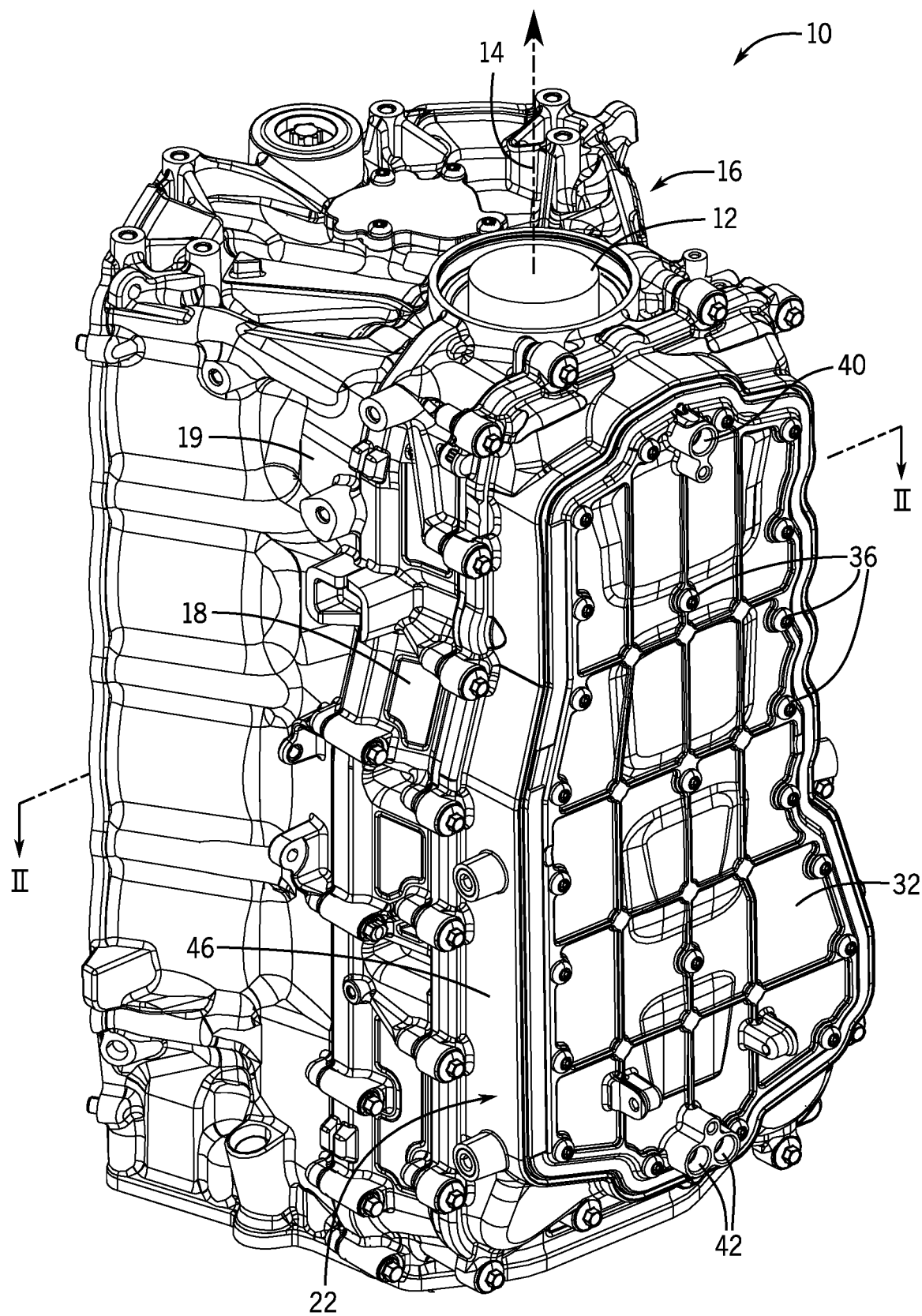
FIG. 1 illustrates a portion of a marine engine according to the present disclosure.
Figure 2:
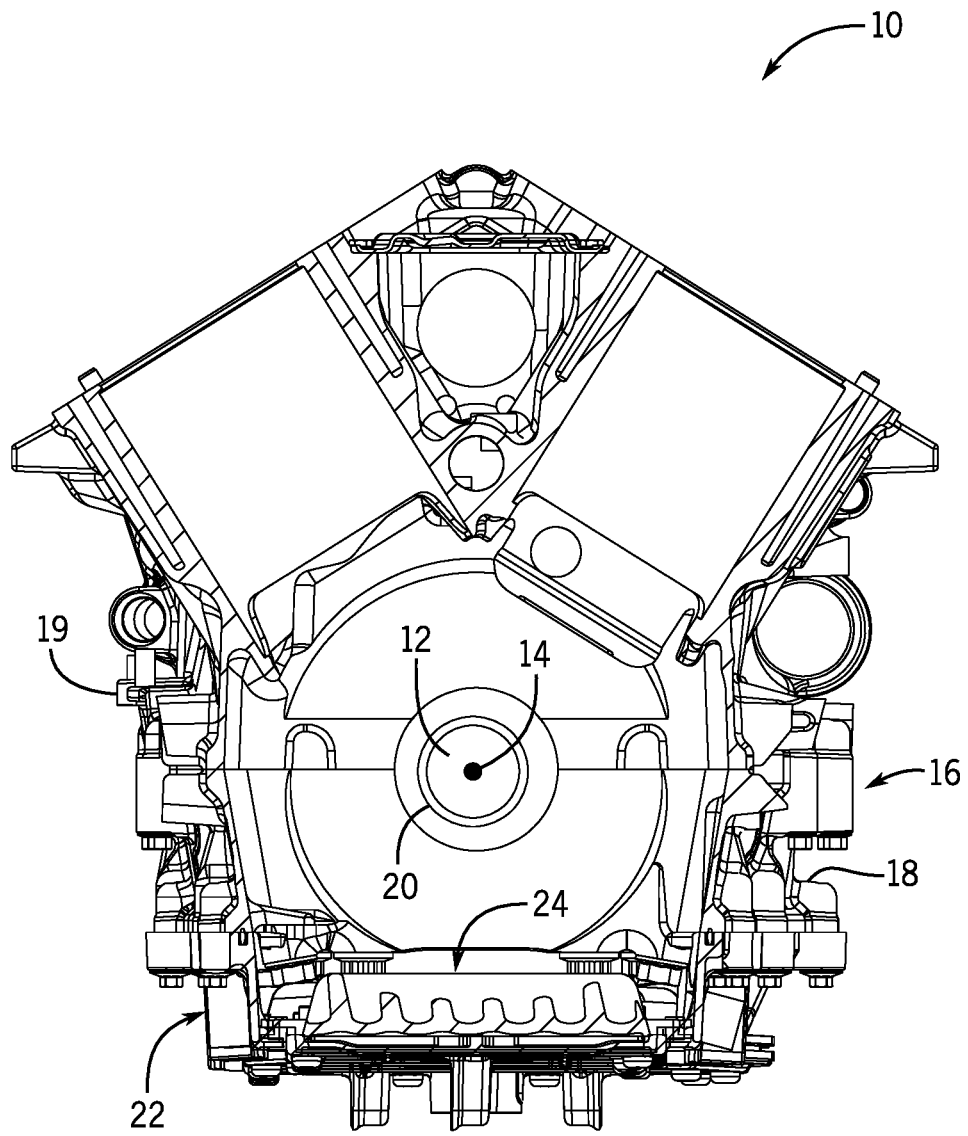
FIG. 2 is a cross-section taken along the line II-II in FIG. 1.

FIG. 1 shows a portion of a marine engine 10, while FIG. 2 shows a cross-section therethrough. In the present example, the marine engine 10 is a V-shaped engine configured to be oriented upright in an outboard motor. As is conventional, combustion of fuel in the marine engine 10 causes rotation of a crankshaft 12 about its crankshaft axis 14. In the present example, the crankshaft axis 14 is vertically oriented, but the crankshaft axis could instead be horizontally oriented. The crankshaft 12 extends through and is supported within a crankcase 16. The crankcase 16, including its bedplate 18, has bearings 20 that support rotation of the crankshaft 12. A crankcase cover 22 is bolted to the bedplate 18 and closes the crankcase 16. Together, crankcase 16, including bedplate 18 and cylinder block 19, and crankcase cover 22 define a crankcase interior that contains lubricant (e.g., oil) for lubricating and facilitating rotation of the crankshaft 12 with respect to the bearings 20.

Rotation of the crankshaft 12 agitates and causes the lubricant in the crankcase interior to impinge on and then, by gravity, drain down the surface 24 of the crankcase cover 22 that faces the crankcase interior. It is known to provide a crankcase cooler to cool the oil as it drains down the inside face of a crankcase cover. For example, the crankcase cooler can include a water jacket defined between two parallel plates of the crankcase cover. However, thermal growth of the hot cylinder block 19 and bedplate 18 and the lack of (or significantly slower) thermal growth of the cold crankcase cooler causes considerable stress concentrations and fatigue issues for the assembly. The joint where the cold cooler meets the hot bedplate 18 is pulled and distorted, causing the joint to open if not adequately bolted, subsequently resulting in leaks. It can be difficult to lower the stresses involved and keep the joint between the crankcase cover and bedplate 18 closed without adding substantial reinforcement and weight. For example, prior art crankcase covers with integral oil coolers are heavily ribbed and use many more bolts than covers without integral coolers, some of which bolts are oversized for the joint.

Therefore, the present inventors discovered, through research and development, that it would be helpful to isolate the cold crankcase cooler from the hot cylinder block 19 and bedplate 18 in order to reduce thermal stresses between the components, while eliminating the need to heavily rib or over-bolt the crankcase cover to the bedplate 18.

The crankcase 16 of FIGS. 1 and 2 is usually made of metal, such as, for example, an aluminum alloy. Some examples of aluminum alloys of which the cylinder block 19 and bedplate 18 can be made are described in U.S. Pat. Nos. 6,923,935; 7,347,905; and 7,666,353, which are hereby incorporated by reference herein, although other alloys could be used. The crankcase 16 is primarily made of this first material, such as by being cast (e.g., lost-foam cast) of the first material, with only insubstantial impurities, and for some components, a powder paint coating to prevent corrosion. Typically, the alloy expands when heated to engine-operating temperatures. According to the present disclosure, the present inventors have developed a crankcase cover 22 that is at least partly made of a second material that is more compliant than this first material of which the crankcase 16 is made, in order to reduce the above-noted stresses caused by differences in thermal growth of the hotter crankcase 16 and the cooler crankcase cover 22.

Figure 3:
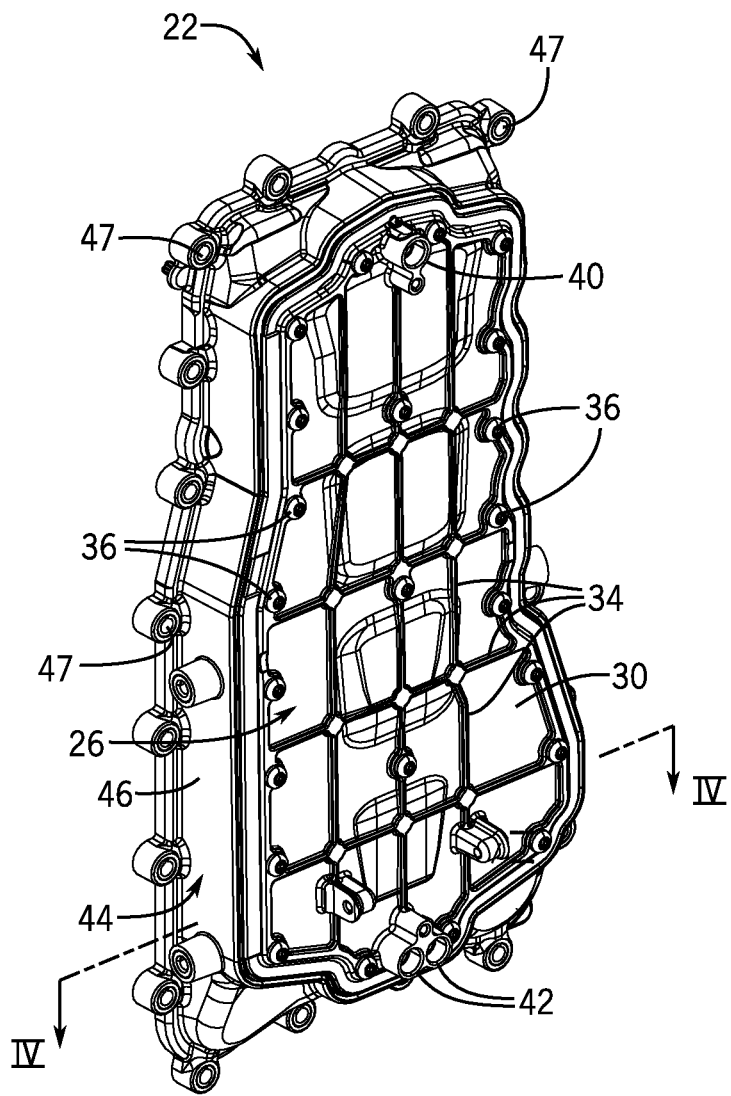
FIG. 3 is a perspective view of the crankcase cover for the engine shown in FIG. 1, shown in isolation.
Figure 4:
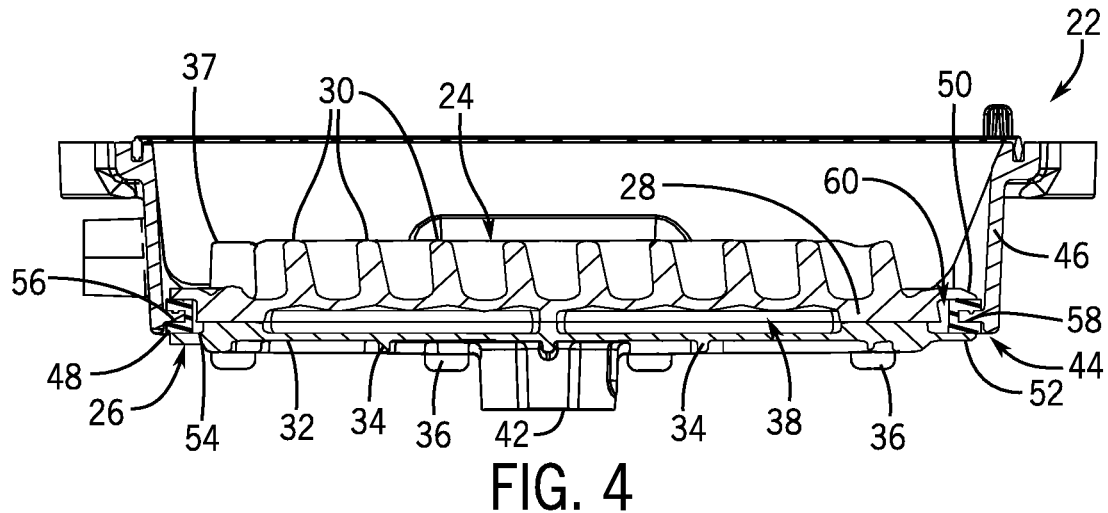
FIG. 4 is a cross-section taken along the line IV-IV in FIG. 3.
Figure 5:
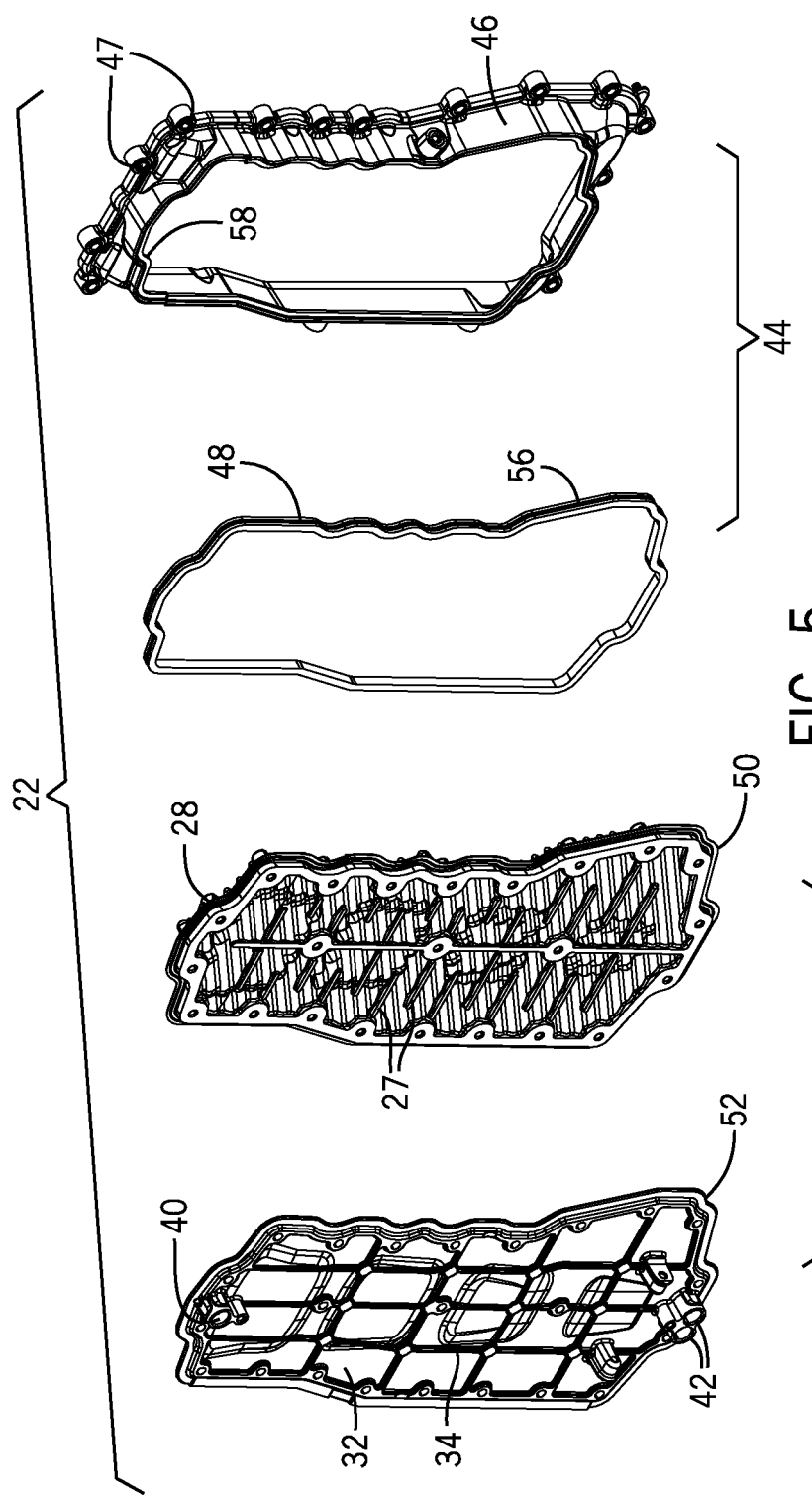
FIG. 5 is an exploded view of the crankcase cover of FIG. 3.

Turning to FIGS. 3-5, the crankcase cover 22 of the present disclosure comprises a heat exchanger 26 (i.e., cooler) having an inner plate 28 facing the interior of the crankcase 16, the inner plate 28 located such that rotation of the crankshaft 12 causes lubricant in the crankcase 16 to impinge upon the inner plate 28. The inner plate 28 includes a plurality of ribs 30 extending generally diagonally across the surface of the inner plate 28 that faces the interior of the crankcase 16, such that oil that impinges on the interior-facing surface of the inner plate 28 is collected and drains slowly down the inner plate 28 between the ribs 30, which act as flow-directing channels and provide increased surface area for heat exchange, allowing as much cooling to occur as possible before the oil drains from the bottom edge of the inner plate 28. In other examples, the ribs can be horizontal, vertical, or any angle in between. The ribs can be straight, curved, or any variation thereof. The interior-facing surface of the inner plate 28 could additionally or alternatively have an irregular or regular surface texture thereto. The ribs and/or surface texture can aid in passively scavenging the oil from blow-by gasses and reduce frictional losses. In still another example, the interior-facing surface the inner plate 28 is smooth. The inner plate 28 can be made of metal, such as, for example, the same aluminum alloy of which the crankcase 16 is made, pure aluminum, pure copper or copper alloys, or another alloy or metallic material. In other examples, the inner plate 28 can be made of a non-metallic compound.

The heat exchanger 26 further comprises an outer plate 32 attached to the inner plate 28 and facing outwardly from the crankcase 16. The outer plate 32 comprises a plurality of ribs 34 extending horizontally and vertically across its outer face, which provide strength to the outer plate 32. The outer plate 32 can be made of metal, such as the above-noted aluminum alloy, or of a polymer, as will be described further herein below. The outer plate 32 is fastened to the inner plate 28 by way of bolts 36 extending into receiving bosses 37 (FIG. 4) in the inner plate 28, although other known fasteners or fastening methods could be used.

A cooling water jacket 38 is defined between the inner plate 28 and the outer plate 32 of the heat exchanger 26. Cooling water is pumped by a pump from a body of water in which the outboard motor is operating or from a container in a closed cooling system, as is conventional, into the cooling water jacket 38 via inlet ports 42. Water flows upwardly between the inner plate 28 and outer plate 32, the facing surfaces of which are provided with corresponding horizontal ribs that contact one another to force the water to flow laterally over the inner plate 28 as well. See for example, ribs 27, FIG. 5. The surface of the inner plate 28 that faces the outer plate 32 may also be provided with diagonal corrugations or other surface irregularities that increase the surface area for heat exchange as well as disrupt the water's flow path to ensure the water velocity is adequate for cooling the inner plate 28, while also creating non-laminar or turbulent flow to increase heat transfer. Once the water reaches the top ends of the inner and outer plates 28, 32, the water exits the water jacket 38 via an outlet port 40, from which it can flow to cool another part of the engine 10 or can be returned to the body of water or the container. In other examples, water enters the water jacket 38 at the top of the water jacket 38 and flows downwardly through the water jacket 38. In still other examples, ports are provided on the sides of the water jacket 38 such that water flows up and across the water jacket 38 or down and across the water jacket 38.

A frame 44 holds the heat exchanger 26 and isolates the heat exchanger 26 from direct contact with the crankcase 16. As noted herein above, in order to reduce thermal stresses caused by relative thermal growth of the hot bedplate 18 with respect to the cooler heat exchanger 26, at least a portion of the frame 44 is made of a second material that is more compliant than the first material (e.g., aluminum alloy) of which the crankcase 16 is made. In the example of FIGS. 3 and 4, the frame 44 comprises an outer casing 46 connected to the crankcase 16 and an inner gasket 48 coupled between the outer casing 46 and the heat exchanger 26. The outer casing 46 is connected to the bedplate 18 by bolts through bolt holes 47 (see also FIGS. 1 and 2). In this example, the inner gasket 48 is made of the second material that is more compliant than the first material of the crankcase 16. Because the more compliant second material of the inner gasket 48 isolates (i.e., prevents contact between) the relatively cool heat exchanger 26 and the relatively hot outer casing 46, which is directly connected to the hot bedplate 18, the more compliant second material is able to absorb any relative movement between the heat exchanger 26 and the outer casing 46 due to their different thermal growth rates.

To provide such isolation, each of the inner plate 28 and the outer plate 32 has a perimetral flange 50, 52, respectively, and a perimetral channel 54 is formed between the perimetral flanges 50, 52 when the outer plate 32 is attached to the inner plate 28, such as by fastening with bolts 36. The inner gasket 48 is seated within the perimetral channel 54. The inner gasket 48 comprises a groove 56 on an outer perimetral surface thereof, providing the inner gasket 48 with a C-shaped cross-section. The outer casing 46 of the frame 44 comprises a flange 58 on an inner perimetral surface thereof, and the outer casing's flange 58 is received in the inner gasket's groove 56 in a fluid-tight manner. The heat exchanger 26 can be held in the frame 44 by way of a pressure fit due to the C-shaped cross-section formed by the inner gasket's groove 56 and the configuration of the inner gasket 48 within the perimetral channel 54 formed by the perimetral flanges 50, 52 on the inner and outer plates 28, 32. Optionally, the parts can be held together by adhesive as well. Optionally, the inner plate 28 and outer plate 32 can be joined such as by adhesive, dip-brazing, furnace brazing, soldering, or mechanical fasteners, and thereafter the inner and outer plates 28, 32 can be joined to the outer casing 46 by, for example, over-molding the inner gasket 48 into the void between the inner plate 28, outer plate 32, and outer casing 46. Optionally, locking tabs or a retaining lip can be provided on the perimeter of the outer plate 28, which tabs or lip can be folded over the inner gasket 48. In still another example, the inner and outer plates 28, 32 are not separate components, but are one integral piece and are formed, for example, by sand casting. The one-piece casting would have a flange like that shown at 50 and a perimeter plate would be bolted on to act as flange 52 to sandwich the inner gasket 48 against the outer casing 46.

Figure 5A:
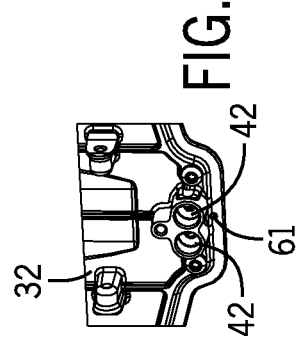
FIG. 5A is a detailed view of a portion of the crankcase cover of FIGS. 1-5.

Note that the inner gasket 48 fits tightly against the opposing surfaces of the perimetral flanges 50, 52 on the inner and outer plates 28, 32 and against the flange 58 on the outer casing 46 in order to prevent leakage of oil from the crankcase 16. However, a fluid passageway 60 is formed between the inner perimetral surface of the inner gasket 48 and the perimetral channel 54 by virtue of the inner gasket 48 having less depth than the perimetral channel 54. Any oil that leaks through the joint from the interior of the crankcase 16 will flow downwardly within the fluid passageway 60. Similarly, any water that leaks through the joint from the cooling water jacket 38 will flow downwardly within the fluid passageway 60. Thus, water is prevented from entering the crankcase 16 and oil is prevented from entering the cooling water jacket 38 in the event of a leak in the joint. The fluid passageway 60 is connected to a vent 61 (FIG. 5A) formed at the lower end of the outer plate 32.

In the example of FIGS. 1-5, the outer casing 46 can be made of a third material that is more compliant than the first material (e.g., aluminum alloy) of which the crankcase 16 is made, but less compliant than the second material of which the inner gasket 48 is made. By way of non-limiting example, the outer casing 46 can be made of a polymer containing glass fibers. For example, the polymer can be a PA66 (nylon 6/6) with (for example) 50% glass fiber; PA6 (nylon 6) or PA66 (nylon 6/6) with any suitable level of glass loading; polyphthalamide (PPA) with any suitable level of glass loading; long glass fiber polypropylene; or sheet molding compound (SMC). In other examples, the polymer contains carbon fiber, poly-paraphenylene terephthalamide fiber, natural fibers (cotton, hemp, coconut husks, etc.). The polymer can additionally or alternatively be reinforced with particles such as minerals, clays, carbon nanotubes, or other nano-particulates to produce enhanced strength. The polymer could be a high-strength crystalline polymer (e.g., PEEK). The polymer needs to be able to withstand operating temperatures of the marine engine 10 while remaining strong enough to be bolted to the bedplate 18, and while also being compliant enough to absorb some of the relative movement between the frame 44 and the heat exchanger 26 due to the temperature difference between the two and any vibrations caused by the engine assembly. In general, the glass loading of the polymer can be adjusted to achieve the desired stiffness of a material that would otherwise be relatively flexible.

While using a polymer outer casing 46 and a compliant inner gasket 48 allows the components of the frame 44 to share the strain caused by the thermal growth of the crankcase 16, in another example, the outer casing 46 is made of the first material (e.g., aluminum alloy) of which the crankcase 16 is made. Alternatively, the outer casing 46 can be made of a metal alloy that is different from the material of which the crankcase 16 is made, but having a similar thermal growth rate to that of the material of which the crankcase 16 is made. In such instances, the inner gasket 48 still works to isolate the cooler heat exchanger 26 from the hotter outer casing 46.

The inner gasket 48 can made of an elastomer. By way of non-limiting examples, the elastomer can be a tetrafluoroethylene proplyene (FEPM) copolymer; acrylonitrile-butadiene rubber (NBR); hydrogenated acrylonitrile-butadiene rubber (HNBR); fluoroelastomer (FKM); or perfluorinated elastomer (FFKM). The elastomer needs to be able to withstand operating temperatures of the marine engine 10 while also being strong enough to be pressure-fit between the heat exchanger 26 and frame 44 and compliant enough to absorb relative movement between the frame 44 and the heat exchanger 26 due to the temperature difference between the two and any vibration caused by the engine assembly.

Figure 6:
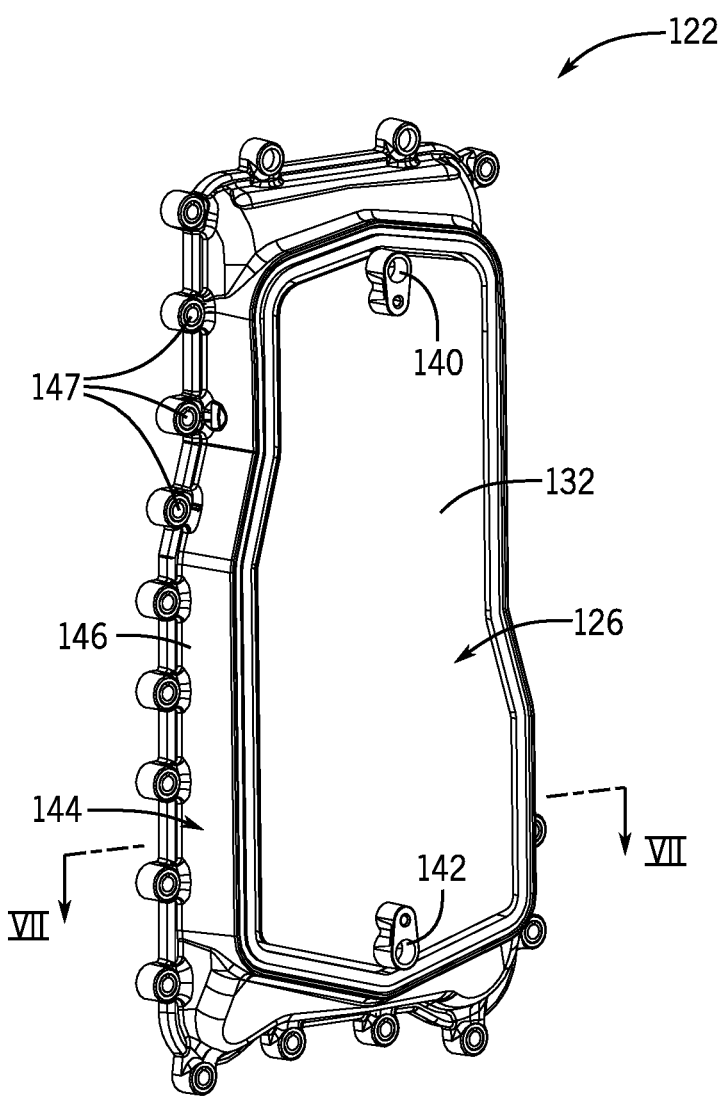
FIG. 6 is a perspective view of an alternative embodiment of a crankcase cover for the engine.
Figure 7:
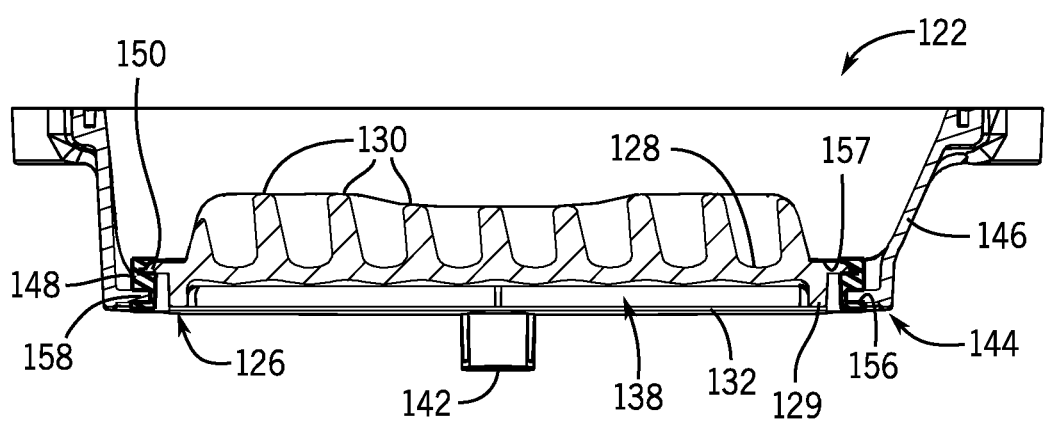
FIG. 7 is a cross-section taken along the line VII-VII in FIG. 6.

FIGS. 6 and 7 illustrate another embodiment of a crankcase cover 122 according to the present disclosure. The crankcase cover 122 can be attached to the same crankcase 16 shown and described with respect to FIGS. 1 and 2. The crankcase cover 122 comprises a heat exchanger 126 (i.e., cooler) having an inner plate 128 facing the interior of the crankcase 16, the inner plate 128 located such that rotation of the crankshaft 12 causes lubricant in the crankcase 16 to impinge upon the inner plate 128. The inner plate 128 includes a plurality of ribs 130 extending generally diagonally across the surface of the inner plate 128 that faces the interior of the crankcase 16, such that oil that impinges on the interior-facing surface of the inner plate 128 is collected and drains down the inner plate 28 between the ribs 130. The inner plate 128 can be made of metal, such as, for example, the same aluminum alloy of which the crankcase 16 is made, pure aluminum, pure copper or copper alloys, or another alloy or metallic material. In other examples, the inner plate 128 can be made of a non-metallic compound.

The heat exchanger 126 further comprises an outer plate 132 attached to the inner plate 128 and configured to face outwardly from the crankcase 16. The outer plate 132 can be made of metal, such as the above-noted aluminum alloy, or of one of the above-noted glass-fiber-containing polymers. The outer plate 132 is connected to the inner plate 128 for example by welding, soldering, adhesive, etc. near the perimeter of the outer plate 132, where the outer plate 132 contacts a raised lip 129 formed on the inner plate 128. Alternatively, the outer plate 132 could be bolted to the inner plate 128 as in the example of FIGS. 1-5.

A cooling water jacket 138 is defined between the inner plate 128 and the outer plate 132 of the heat exchanger 126.

Cooling water is pumped into the cooling water jacket 138 via an inlet port 142. Water flows upwardly between the inner plate 128 and outer plate 132. The surface of the inner plate 128 that faces the outer plate 132 may be provided with diagonal corrugations or other surface irregularities that increase the surface area for heat exchange as well as disrupt the water's flow path to ensure the water velocity is adequate for cooling the inner plate 128, while also creating non-laminar or turbulent flow to increase heat transfer. The water exits the cooling water jacket 138 via an outlet port 140.

A frame 144 holds the heat exchanger 126 and isolates the heat exchanger 126 from direct contact with the crankcase 16. As noted herein above, in order to reduce thermal stresses caused by relative thermal growth of the hot bedplate 18 with respect to the cooler heat exchanger 126, at least a portion of the frame 144 is made of a second material that is more compliant than the first material (e.g., aluminum alloy) of which the crankcase 16 is made. In the example of FIGS. 6 and 7, the frame 144 comprises an outer casing 146 connected to the crankcase 16 and an inner gasket 148 coupled between the outer casing 146 and the heat exchanger 126. The outer casing 146 is connected to the bedplate 18 by bolts through bolt holes 147. In this example, the inner gasket 148 is made of the second material that is more compliant than the first material of the crankcase 16. Because the more compliant second material of the inner gasket 148 isolates (i.e., prevents contact between) the relatively cool heat exchanger 126 and the relatively hot outer casing 146, which is directly connected to the hot bedplate 18, the more compliant second material is able to absorb any relative movement between the heat exchanger 126 and the outer casing 146 due to their different thermal growth rates.

To provide such isolation, the inner plate 128 has an outer perimetral flange 150. The inner gasket 148 comprises a first groove 156 on an outer perimetral surface thereof and a second groove 157 on an inner perimetral surface thereof, providing the inner gasket 148 with an S-shaped cross-section. The outer perimetral flange 150 on the inner plate 128 is received within the second groove 157 in the inner gasket 148 in a fluid-tight manner. The outer casing 146 of the frame 144 comprises an inner perimetral flange 158 on an inner perimetral surface thereof, and the outer casing's flange 158 is received in the inner gasket's first groove 156 in a fluid-tight manner. The inner plate 128 and the outer plate 132 can be joined such as by adhesive, dip brazing, furnace brazing, soldering, or mechanical fasteners, and the inner plate 128 can be joined to the outer casing 146 by, for example, over-molding the inner gasket 148 into the void between the inner plate 128 and the outer casing 146 in order to hold the heat exchanger 126 within the frame 144.

In the example of FIGS. 6 and 7, the outer casing 146 can be made of a third material that is more compliant than the first material (e.g., aluminum alloy) of which the crankcase 16 is made, but less compliant than the second material of which the inner gasket 148 is made. By way of non-limiting example, the outer casing 146 can be made of a polymer containing glass fibers, such as one of the polymers listed herein above. In another example, the outer casing 146 is made of the first material (e.g., aluminum alloy) of which the crankcase 16 is made or of a metal alloy that is different from the material of which the crankcase 16 is made. Like the first embodiment, the inner gasket 148 can made of an elastomer, such as one of the elastomers listed herein above.

In another example, the outer perimeter of the inner plate 128 is held to the inner perimeter of the outer casing 146 by way of an inner gasket having an I-shaped cross-section. A groove on the outer side of the gasket holds the inner perimetral flange 158 of the outer casing 146, while a groove on the inner side of the gasket holds the outer perimetral flange 150 of the inner plate 128. The I-shaped inner gasket could be over-molded to one or both of the inner plate 128 and the outer casing 146.

Figure 8:
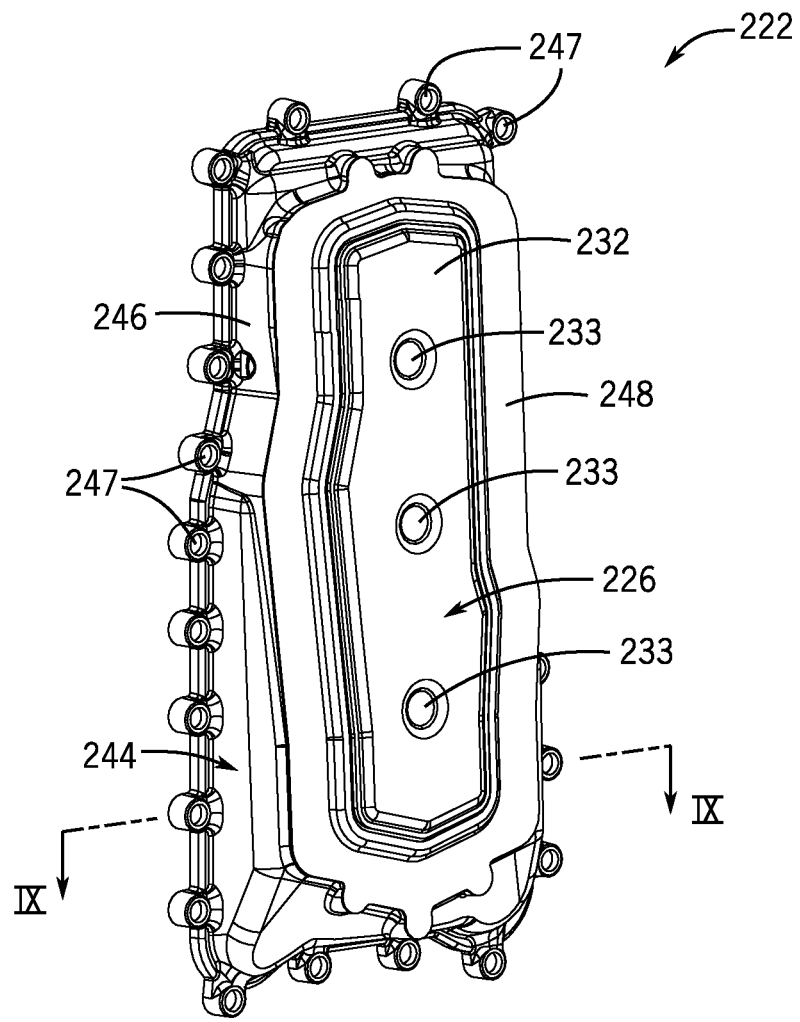
FIG. 8 is a perspective view of an alternative embodiment of a crankcase cover for the engine.
Figure 9:
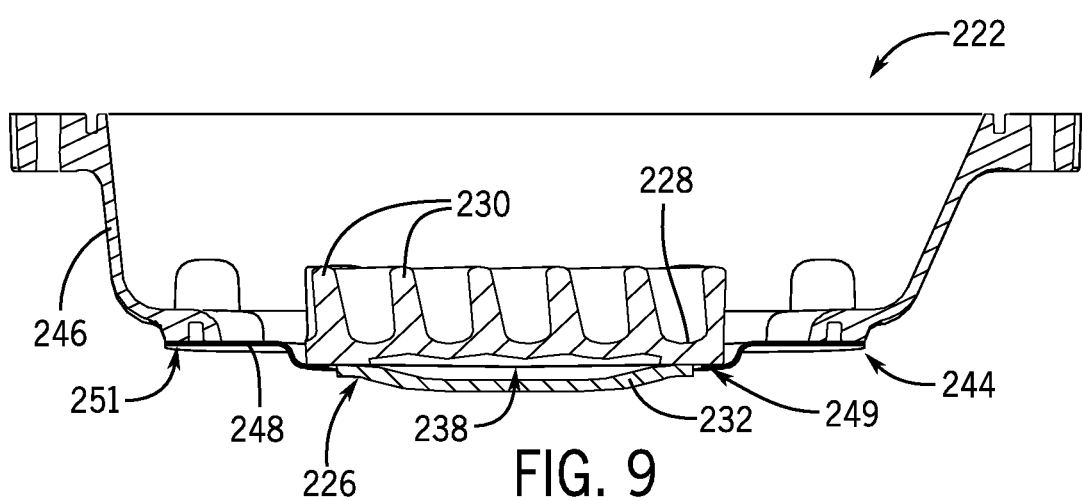
FIG. 9 is a cross-section taken along the line IX-IX in FIG. 8.

FIGS. 8 and 9 illustrate another embodiment of a crankcase cover 222 according to the present disclosure. The crankcase cover 222 can be attached to the same crankcase 16 shown and described with respect to FIGS. 1 and 2. The crankcase cover 222 comprises a heat exchanger 226 (i.e., cooler) having an inner plate 228 facing the interior of the crankcase 16, the inner plate 228 located such that rotation of the crankshaft 12 causes lubricant in the crankcase 16 to impinge upon the inner plate 228. The inner plate 228 includes a plurality of ribs 230 extending generally diagonally across the surface of the inner plate 228 that faces the interior of the crankcase 16, such that oil that impinges on the interior-facing surface of the inner plate 228 is collected and drains down the inner plate 228 between the ribs 230. The inner plate 228 can be made of metal, such as, for example, the same aluminum alloy of which the crankcase 16 is made, pure aluminum, pure copper or copper alloys, or another alloy or metallic material. In other examples, the inner plate 228 can be made of a non-metallic compound.

The heat exchanger 226 further comprises an outer plate 232 attached to the inner plate 228 and facing outwardly from the crankcase 16. The outer plate 232 can be made of metal, such as the above-noted aluminum alloy, or of a polymer, such as one of the glass-fiber-containing polymers listed herein above. The outer plate 232 is connected to the inner plate 228 for example by welding, soldering, adhesive, etc. near the outer perimeter of the outer plate 232, as well as at locations where the outer plate 232 is indented (see indentations 233, FIG. 8) to contact the inner plate 228. Alternatively, the outer plate 232 could be bolted to the inner plate 228 as in the example of FIGS. 1-5.

A cooling water jacket 238 is defined between the inner plate 228 and the outer plate 232 of the heat exchanger 226. Cooling water is pumped into the cooling water jacket 238 via an inlet port (not shown, but see above examples). Water flows upwardly between the inner plate 228 and outer plate 232. The surface of the inner plate 228 that faces the outer plate 232 may be provided with diagonal corrugations or other surface irregularities that increase the surface area for heat exchange as well as disrupt the water's flow path to ensure the water velocity is adequate for cooling the inner plate 228, while also creating non-laminar or turbulent flow to increase heat transfer. Water exits the cooling water jacket 238 via an outlet port (not shown, but see above examples).

A frame 244 holds the heat exchanger 226 and isolates the heat exchanger 226 from direct contact with the crankcase 16. As noted herein above, in order to reduce thermal stresses caused by relative thermal growth of the hot bedplate 18 with respect to the cooler heat exchanger 226, at least a portion of the frame 244 is made of a second material that is more compliant than the first material (e.g., aluminum alloy) of which the crankcase 16 is made. In the example of FIGS. 8 and 9, the frame 244 comprises an outer casing 246 connected to the crankcase 16 and an inner gasket 248 coupled between the outer casing 246 and the heat exchanger 226. The outer casing 246 is connected to the bedplate 18 by bolts through bolt holes 247. In this example, the inner gasket 248 is made of the second material that is more compliant than the first material of the crankcase 16. Because the more compliant second material of the inner gasket 248 isolates (i.e., prevents contact between) the relatively cool heat exchanger 226 and the relatively hot outer casing 246, which is directly connected to the hot bedplate 18, the more compliant second material is able to act as a spring or bellows to absorb any relative movement between the heat exchanger 226 and the outer casing 246 due to their different thermal growth rates.

To provide such isolation, the inner gasket 248 is attached near an outer perimeter 251 thereof to a front surface of the outer casing 246 near its inner perimeter. The inner gasket 248 is attached near an inner perimeter 249 thereof to a front surface of the inner plate 228 near its outer perimeter. The inner plate 228 can be attached to the outer plate 232 for example by adhesive, dip-brazing, furnace brazing, soldering, or mechanical fasteners. The inner and outer plates 228, 232 can thereafter be connected to the outer casing 246 by over-molding the inner gasket 248 into the space between the connected inner and outer plates 228, 232 and the outer casing 246. Alternatively, the inner gasket 248 can be adhered or mechanically fastened to the inner plate 228 and/or outer casing 246.

In the example of FIGS. 8 and 9, the outer casing 246 is made of a third material that is more compliant than the first material (e.g., aluminum alloy) of which the crankcase 16 is made, but less compliant than the second material of which the inner gasket 248 is made. By way of non-limiting example, the outer casing 246 can be made of a polymer containing glass fibers, such as one of the polymers listed herein above. In another example, the outer casing 246 is made of the first material (e.g., aluminum alloy) of which the crankcase 16 is made or of a metal alloy that is different from the material of which the crankcase 16 is made. Like the first embodiment, the inner gasket 248 can made of an elastomer, such as one of the elastomers listed herein above.

Figure 10:
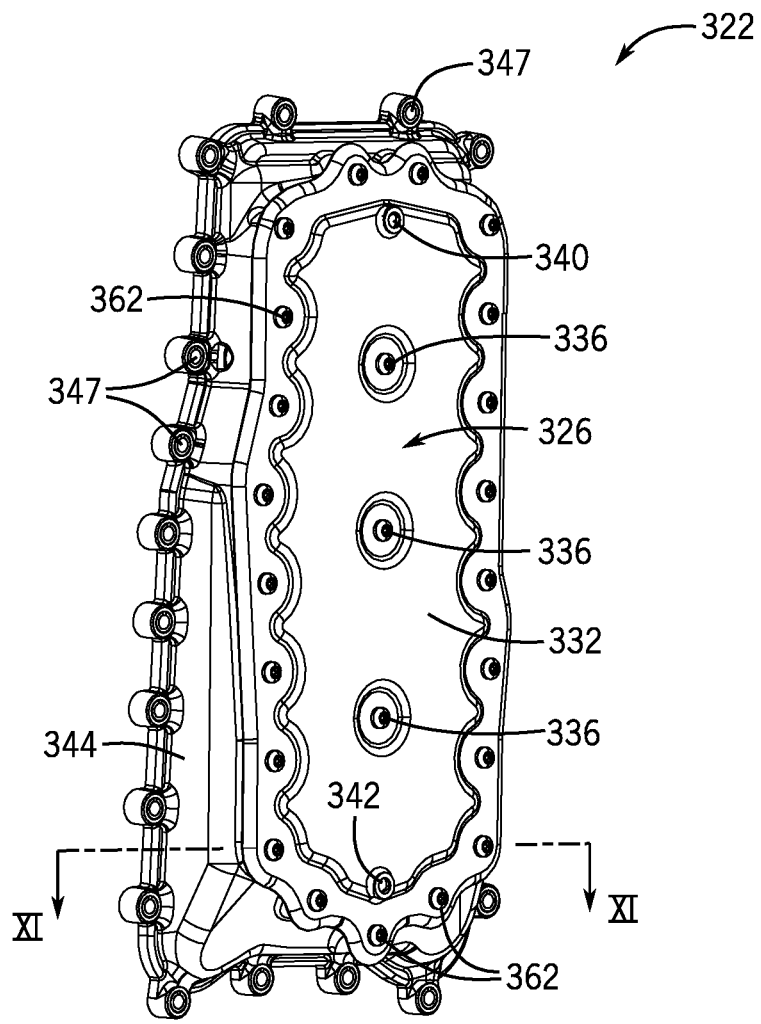
FIG. 10 is a perspective view of an alternative embodiment of a crankcase cover for the engine.
Figure 11:
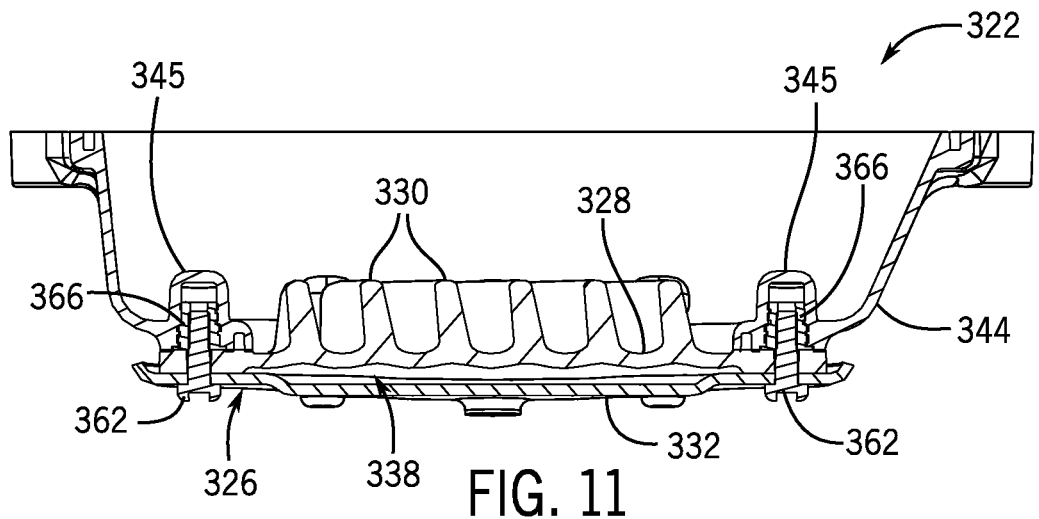
FIG. 11 is a cross-section taken along the line XI-XI in FIG. 10.

FIGS. 10 and 11 illustrate another embodiment of a crankcase cover 322 according to the present disclosure. The crankcase cover 322 can be attached to the same crankcase 16 shown and described with respect to FIGS. 1 and 2. The crankcase cover 322 comprises a heat exchanger 326 (i.e., cooler) having an inner plate 328 facing the interior of the crankcase 16, the inner plate 328 located such that rotation of the crankshaft 12 causes lubricant in the crankcase 16 to impinge upon the inner plate 328. The inner plate 328 includes a plurality of ribs 330 extending generally diagonally across the surface of the inner plate 328 that faces the interior of the crankcase 16, such that oil that impinges on the interior-facing surface of the inner plate 328 is collected and drains down the inner plate 328 between the ribs 330. The inner plate 328 can be made of metal, such as, for example, the same aluminum alloy of which the crankcase 16 is made, pure aluminum, pure copper or copper alloys, or another alloy or metallic material. In other examples, the inner plate 328 can be made of a non-metallic compound.

The heat exchanger 326 further comprises an outer plate 332 attached to the inner plate 328 and facing outwardly from the crankcase 16. The outer plate 332 can be made of metal, such as the above-noted aluminum alloy, or of a polymer, such as one of the glass-fiber-containing polymers listed herein above. The outer plate 332 is bolted to the inner plate 328 proximate the vertical centerlines thereof by bolts 336 received in bosses (not shown) formed in the inner plate 328. Additionally or alternatively, the outer plate 332 can be connected to the inner plate 328 for example by welding, soldering, adhesive, or other known methods. The outer plate 332 is also connected to the inner plate 328 by bolts 362 around the perimeters of the inner and outer plates 328, 332, as will be described further herein below.

A cooling water jacket 338 is defined between the inner plate 328 and the outer plate 332 of the heat exchanger 326. Cooling water is pumped into the cooling water jacket 338 via an inlet port 342. Water flows upwardly between the inner plate 328 and outer plate 332. The surface of the inner plate 328 that faces the outer plate 332 may be provided with diagonal corrugations or other surface irregularities that increase the surface area for heat exchange as well as disrupt the water's flow path to ensure the water velocity is adequate for cooling the inner plate 328, while also creating non-laminar or turbulent flow to increase heat transfer. The water exits the cooling water jacket 338 via an outlet port 340.

A frame 344 holds the heat exchanger 326 and isolates the heat exchanger 326 from direct contact with the crankcase 16. As noted herein above, in order to reduce thermal stresses caused by relative thermal growth of the hot bedplate 18 with respect to the cooler heat exchanger 326, at least a portion of the frame 344 is made of a second material that is more compliant than the first material (e.g., aluminum alloy) of which the crankcase 16 is made. In the example of FIGS. 10 and 11, the entire frame 344 is made of the second material, and the frame 344 is directly connected to the heat exchanger 326 and to the crankcase 16. The frame 344 is connected to the heat exchanger 326 by way of the above-noted bolts 362, which extend through holes in the inner and outer plates 328, 332 and into receiving bosses 345 formed around the inner perimeter of the frame 344. Plastic or elastomeric threaded inserts 366 can be provided in the receiving bosses 345 to prevent leakage.

As with the previous embodiments, the frame 344 is connected to the bedplate 18 by bolts through bolt holes 347. Because the more compliant second material of the frame 344 isolates (i.e., prevents contact between) the relatively cool heat exchanger 326 and the relatively hot bedplate 18, the more compliant second material is able to stretch and deform to absorb any relative movement between the heat exchanger 326 and the bedplate 18 due to their different thermal growth rates. In the example of FIGS. 10 and 11, the second material of which the frame 344 is made can a polymer containing glass fibers, such as one of the polymers listed herein above as suitable for the outer casings 46, 146, 246. Note that no elastomer inner gasket is required in this embodiment. The polymer can be selected to grow at a multiple of the growth rate of the first material (e.g., the aluminum alloy) of which the crankcase 16 is made, such that the polymer frame 344 grows with the crankcase 16, despite being cooler than the crankcase.

The present disclosure is thus of a cover 22, 122, 222, 322 for a crankcase 16 of a marine engine 10. The crankcase cover 22, 122, 222, 322 comprises a heat exchanger 26, 126, 226, 326 having an inner plate 28, 128, 228, 328 configured to face an interior of the crankcase 16 when the crankcase cover 22, 122, 222, 322 is installed on the crankcase 16 such that rotation of a crankshaft 12 supported in the crankcase 16 causes lubricant in the crankcase to impinge upon the inner plate 28, 128, 228, 328. A frame 44, 144, 244, 344 holds the heat exchanger 26, 126, 226, 326 and is configured to isolate the heat exchanger 26, 126, 226, 326 from direct contact with the crankcase 16. At least a portion of the frame 44, 144, 244, 344 is made of a material that is more compliant than a material of which the crankcase 16 is made in order to prevent different thermal growth rates of the heat exchanger 26, 126, 226, 326 and crankcase 16 from creating stress in the components that tends to cause cracking thereof.

In the present description, certain terms have been used for brevity, clarity, and understanding. No unnecessary limitations are to be implied therefrom beyond the requirement of the prior art because such terms are used for descriptive purposes only and are intended to be broadly construed. The different assemblies described herein may be used alone or in combination with other systems. Various equivalents, alternatives, and modifications are possible within the scope of the appended claims.

What is claimed is:

1. A marine engine comprising:
   a crankshaft that rotates about a crankshaft axis;
   a crankcase supporting the crankshaft, the crankcase being made primarily of a first material;
   a cover on the crankcase, the cover comprising:
      a heat exchanger having an inner plate facing an interior of the crankcase, the inner plate located such that rotation of the crankshaft causes lubricant in the crankcase to impinge upon the inner plate;
      a frame holding the heat exchanger and isolating the heat exchanger from direct contact with the crankcase, at least a portion of the frame being made of a second material that is more compliant than the first material;
   wherein the frame comprises an outer casing connected to the crankcase and an inner gasket coupled between the outer casing and the heat exchanger, the inner gasket being made of the second material and extending around a perimeter of the heat exchanger.

2. The marine engine of claim 1, wherein the outer casing is made of a third material that is more compliant than the first material but less compliant than the second material.

3. The marine engine of claim 1, wherein the heat exchanger further comprises an outer plate attached to the inner plate and facing outwardly from the crankcase, a cooling water jacket being defined between the inner plate and the outer plate of the heat exchanger;
   wherein each of the inner plate and the outer plate has a perimetral flange, a perimetral channel being formed between the perimetral flanges when the outer plate is attached to the inner plate; and
   wherein the inner gasket is seated within the perimetral channel.

4. The marine engine of claim 3, wherein the inner gasket comprises a groove on an outer perimetral surface thereof, and the outer casing comprises a flange on an inner perimetral surface thereof, the outer casing's flange being received in the inner gasket's groove in a fluid-tight manner.

5. The marine engine of claim 4, wherein a fluid passageway is formed between an inner perimetral surface of the inner gasket and the perimetral channel, the fluid passageway being connected to a vent.

6. The marine engine of claim 1, wherein the inner gasket is made of an elastomer.

7. The marine engine of claim 1, wherein the outer casing is made of a polymer containing glass fibers.

8. The marine engine of claim 1, wherein the heat exchanger further comprises an outer plate attached to or integrally cast with the inner plate and facing outwardly from the crankcase, and wherein a cooling water jacket is defined between the inner plate and the outer plate.

9. A cover for a crankcase of a marine engine, the cover comprising:
   a heat exchanger having an inner plate configured to face an interior of the crankcase when the cover is installed on the crankcase such that rotation of a crankshaft supported in the crankcase causes lubricant in the crankcase to impinge upon the inner plate; and
   a frame holding the heat exchanger and configured to isolate the heat exchanger from direct contact with the crankcase;
   wherein at least a portion of the frame is made of a material that is more compliant than a material of which the crankcase is made; and
   wherein the frame comprises an outer casing configured to be connected to the crankcase and an inner gasket coupled between the outer casing and the heat exchanger, the inner gasket being made of the more compliant material and extending around a perimeter of the heat exchanger.

10. The cover of claim 9, wherein the outer casing is made of a material that is more compliant than the material of which the crankcase is made, but less compliant than the material of which the inner gasket is made.

11. The cover of claim 9, wherein the heat exchanger further comprises an outer plate attached to the inner plate and configured to face outwardly from the crankcase when the cover is installed on the crankcase, a cooling water jacket being defined between the inner plate and the outer plate of the heat exchanger;
    wherein each of the inner plate and the outer plate has a perimetral flange, a perimetral channel being formed between the perimetral flanges when the outer plate is attached to the inner plate; and
    wherein the inner gasket is seated within the perimetral channel.

12. The cover of claim 11, wherein the inner gasket comprises a groove on an outer perimetral surface thereof, and the outer casing comprises a flange on an inner perimetral surface thereof, the outer casing's flange being received in the inner gasket's groove in a fluid-tight manner.

13. The cover of claim 12, wherein a fluid passageway is formed between an inner perimetral surface of the inner gasket and the perimetral channel, the fluid passageway being connected to a vent.

14. The cover of claim 9, wherein the inner gasket is made of an elastomer.

15. The cover of claim 9, wherein the outer casing is made of a polymer containing glass fibers.

16. The cover of claim 9, wherein the heat exchanger further comprises an outer plate attached to or integrally cast with the inner plate and configured to face outwardly from the crankcase when the cover is attached to the crankcase, and wherein a cooling water jacket is defined between the inner plate and the outer plate.

* * * * *